March 6, 1962   A. V. LARSON ETAL   3,023,826
VEHICLE HAVING PNEUMATIC BAG ROLLERS INSTEAD OF WHEELS
Filed Aug. 15, 1956   5 Sheets-Sheet 1
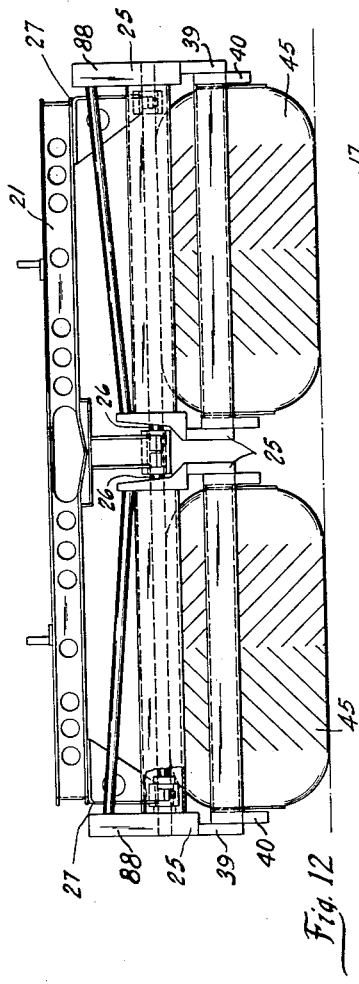
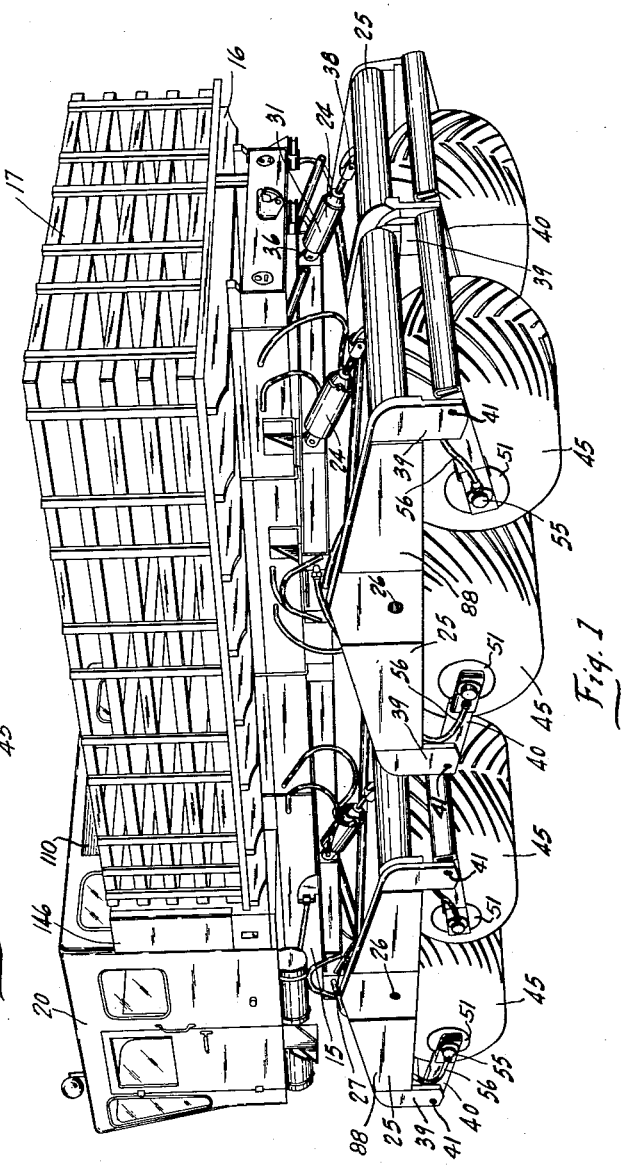
INVENTORS
ARNE V. LARSON   DAVID G. SCHROEDER
BY FRANCIS M. MARSHEK   BRYAN WRIGHT
ROBERT M. PUTZER   JOHN P. MANN
Wheeler, Wheeler & Wheeler
ATTORNEYS

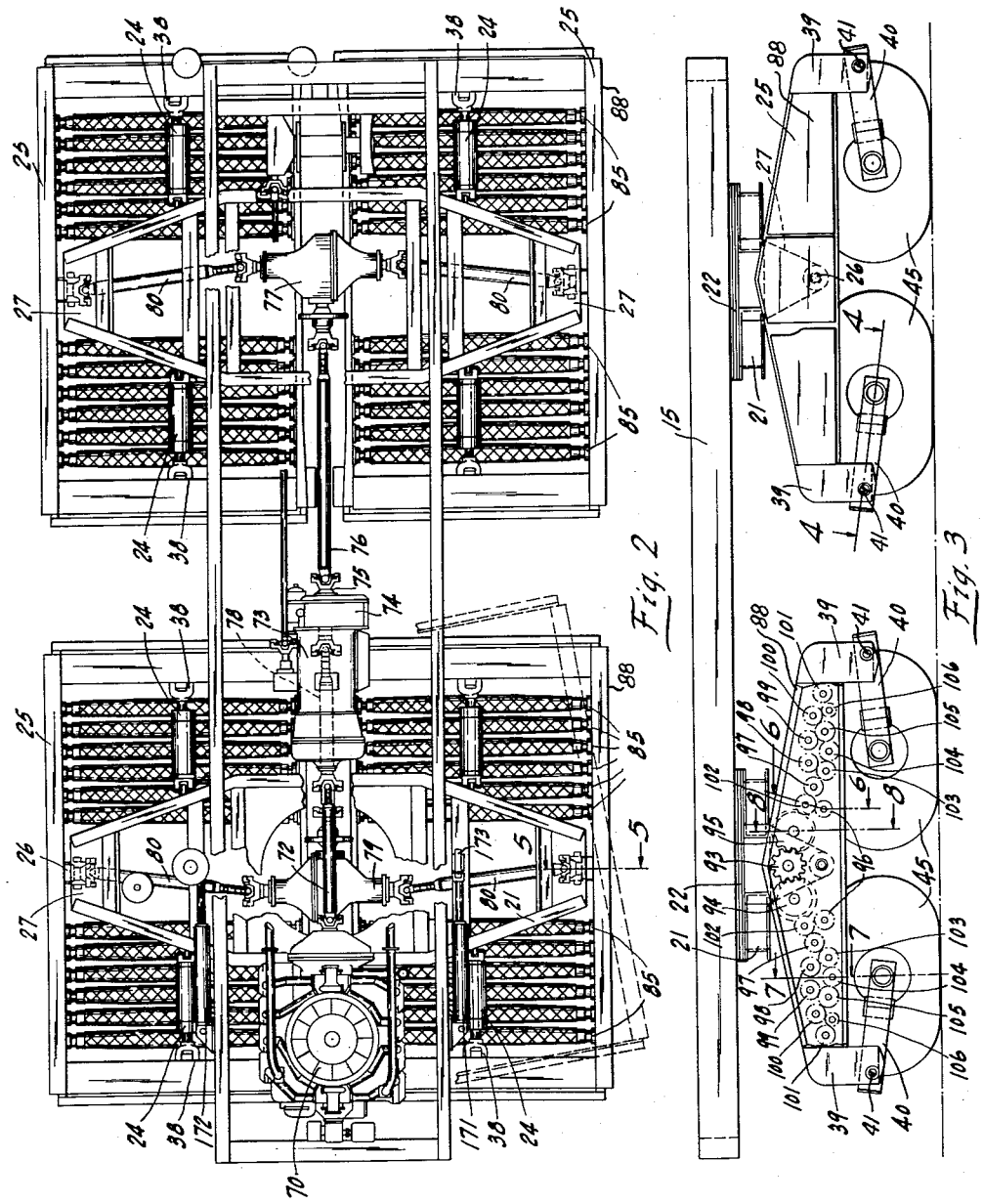

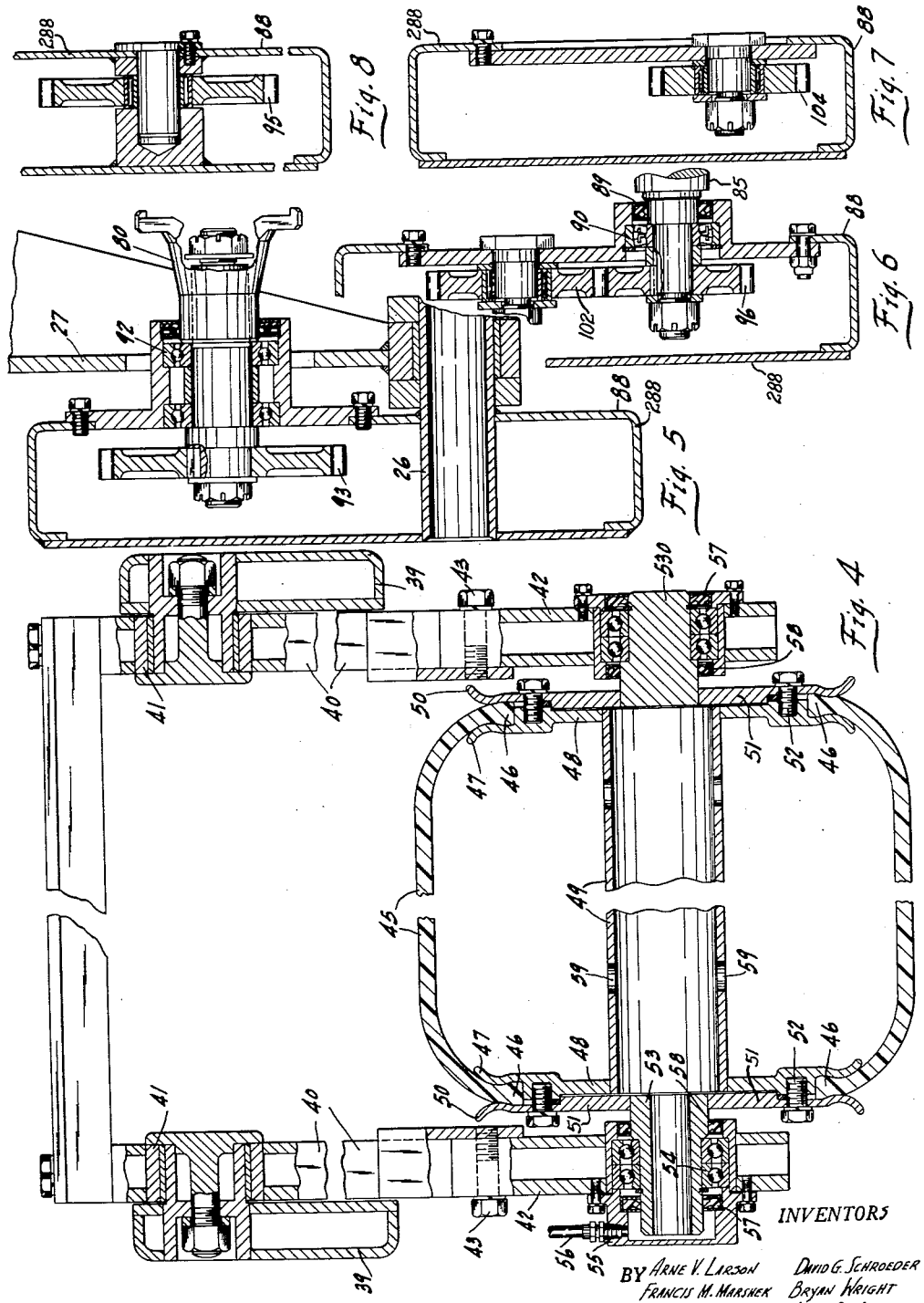

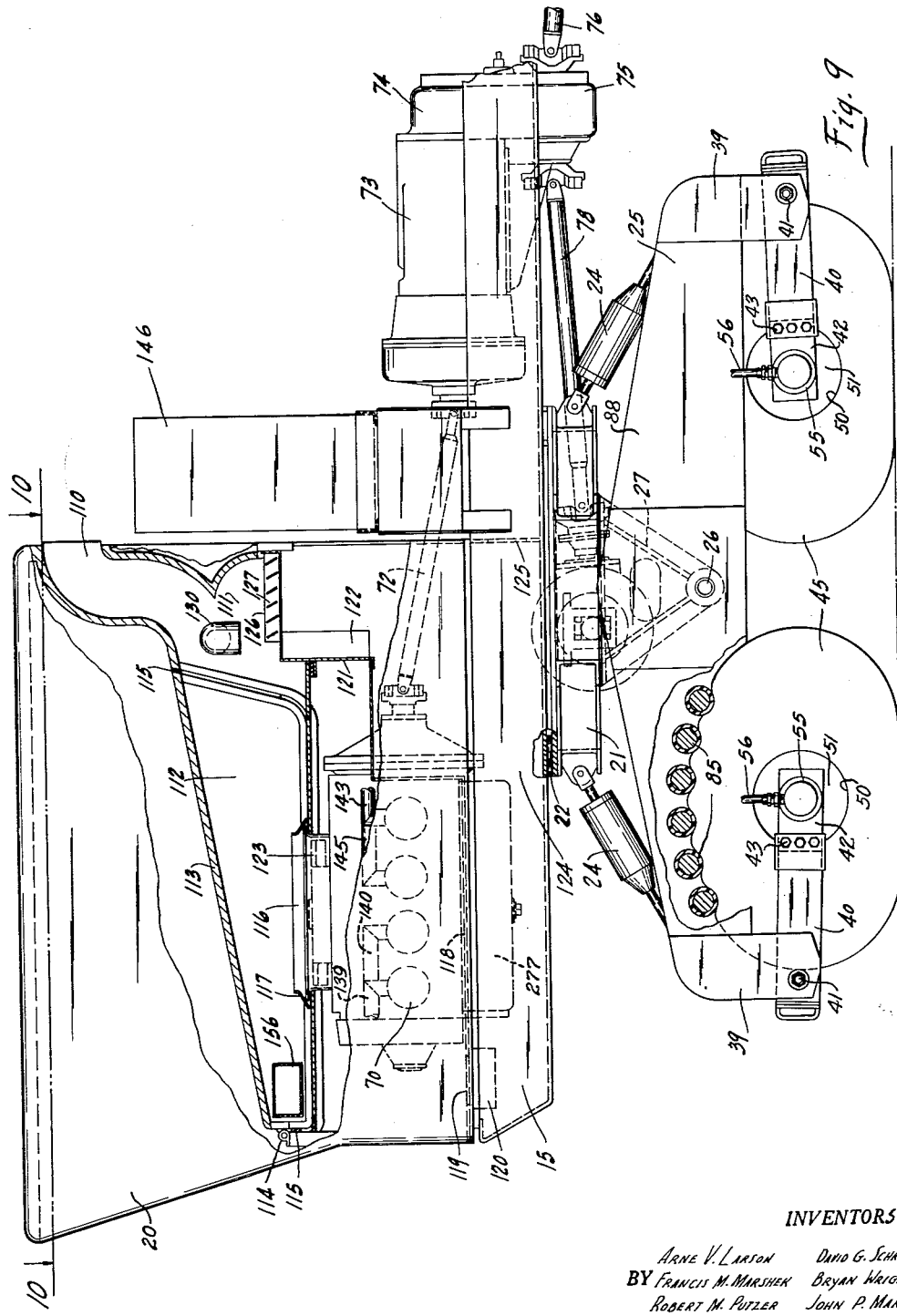

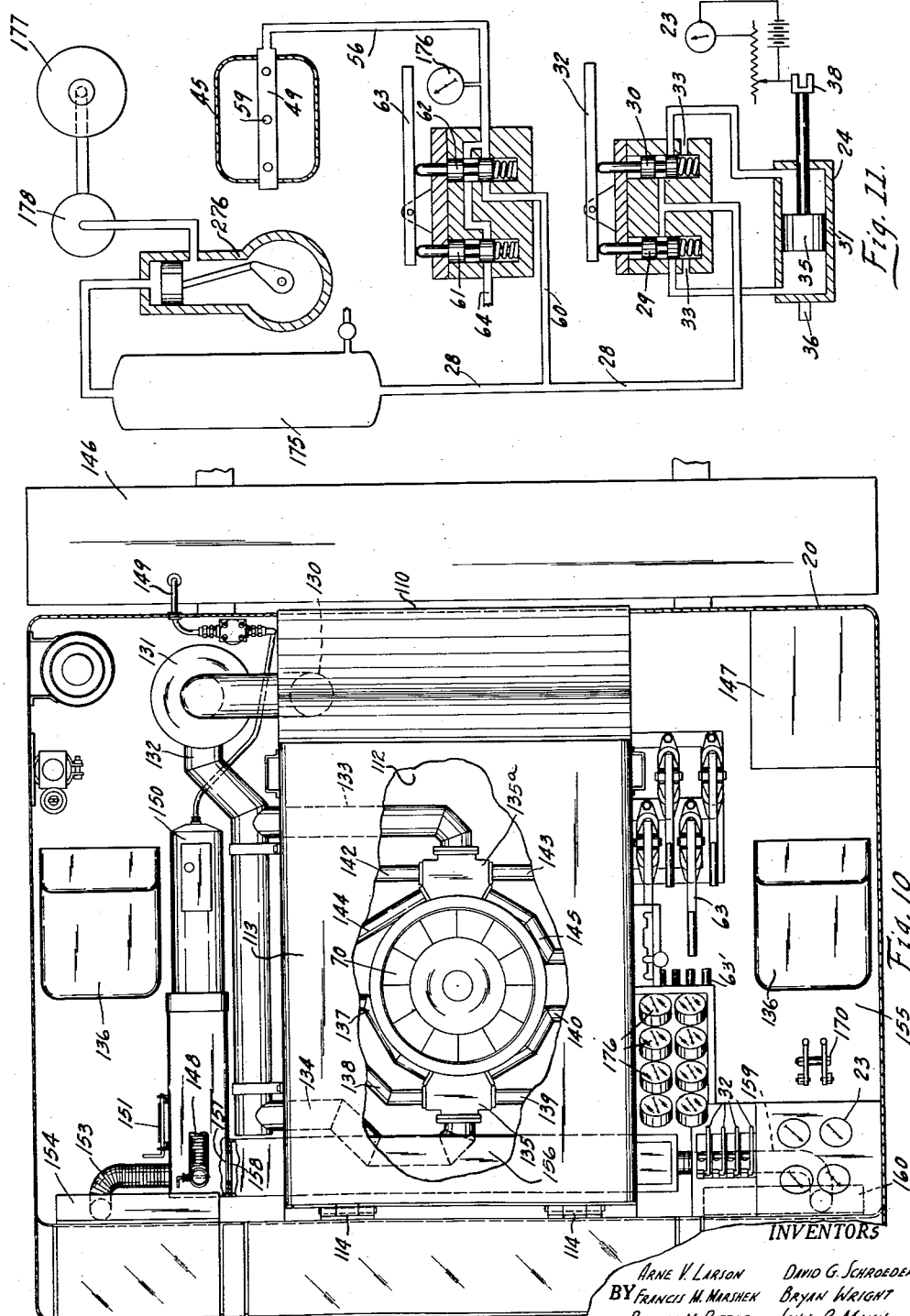

United States Patent Office 3,023,826
Patented Mar. 6, 1962

3,023,826
VEHICLE HAVING PNEUMATIC BAG ROLLERS
INSTEAD OF WHEELS
Arne V. Larson, Francis M. Marshek, Robert M. Putzer, David G. Schroeder, and Bryan Wright, Clintonville, Wis., and John P. Mann, Bradford, Pa., assignors to FWD Corporation, a corporation of Wisconsin
Filed Aug. 15, 1956, Ser. No. 604,136
18 Claims. (Cl. 180—23)

This invention relates to a vehicle having pneumatic bag rollers instead of wheels.

The present application is concerned with the manner in which the bags are mounted and driven and, also, with the installation of the engine and controls in the cab.

There are at least two bogies beneath the vehicle frame, at least one of which can be steered by bodily pivotal movement using a fifth wheel. Each bogie includes a main frame and a sub-frame pivoted to the main frame. It is a feature of the invention that the sub-frame is tiltable by power to raise either its forward or its rear end at the option of the operator.

Each bogie mounts a plurality of the inflated rollers, there being four rollers beneath each bogie sub-frame in actual practice. In effect, there is no actual wheel. Each roller is tubular and has end flanges engaged between the clamping flanges carried by an axle. However, the axle is idle and support for the sub-frame is provided by a series of spindle-like rollers which rest on the respective inflated rollers and not only support the sub-frame but transmit the driving motion to the bags. The general organization is similar to some of the disclosure of Albee 2,714,011. The train of driving gears is believed to be unique.

It is desirable to be able to vary the inflation of the supporting bag according to the terrain traversed by the vehicle. Means is provided by which fluidtight communication is maintained with each bag at all times, whereby the operator can inflate or deflate the bag instantly, whether the vehicle is at rest or in motion.

The engine is, in practice, desirably air cooled to eliminate any freezing problem. The preferred engine is a pancake type engine having horizontally opposed banks of four cylinders each. Arrangement is made for circulating cooling air over all of the cylinders. In order to give ready access to the engine, while at the same time providing for air circulation, the main air supply duct is built into the hood which covers the engine. The hood also includes a cross connection between the two sides of the cab for carrying air from the heater across the engine both to insure the comfort of the two occupants of the cab and to operate defrosters for the benefit of both occupants. The roof of the cab opens over the hood to permit engine installation and removal.

Power from the engine passes through a transmission and center differential to a pair of differentials which distribute power to the sets of supporting and driving spindles which rest on the inflated bags at opposite sides of the vehicle.

In the drawings:
FIG. 1 is a view in perspective of a vehicle embodying the invention.
FIG. 2 is a diagrammatic view in plan showing the respective bogies with portions of the vehicle frame and body removed, portions of the driving connections being broken away.
FIG. 3 is a diagrammatic side elevational view of the vehicle frame and bogies, with the vehicle body removed and portions of one of the bogies broken away to show the gear trains for driving its spindles.
FIG. 4 is a view on an enlarged scale taken in section on line 4—4 of FIG. 3.
FIG. 5 is a view on an enlarged scale taken in section on line 5—5 of FIG. 2.
FIG. 6 is a view on an enlarged scale taken in section on line 6—6 of FIG. 3.
FIG. 7 is a view on an enlarged scale taken in section on line 7—7 of FIG. 3.
FIG. 8 is a view on an enlarged scale taken in section on line 8—8 of FIG. 3.
FIG. 9 is a view on an enlarged scale partially in side elevation and partially in longitudinal section fragmentarily illustrating the front end of the vehicle, portions of the cab and one of the bogie sub-frames being broken away.
FIG. 10 is a view taken in section on line 10—10 of FIG. 9, portions of the hood being broken away.
FIG. 11 is a diagrammatic view of some of the pneumatic operating system, some of the parts being shown in section and some in side elevation.
FIG. 12 is a view of a bogie in rear elevation.

The vehicle frame 15 supports any desired type of bed 16 with or without a load enclosing body 17. At its forward end, there is a cab 20 which will hereinafter be described in more detail.

The main frame 15 of the vehicle is supported on at least two bogies as best shown in FIGS. 2 and 3. Each bogie includes a bogie frame 21. The bogie frame 21 of the forward bogie is pivoted on a fifth wheel 22 as best shown in FIG. 9. It is immaterial to the present invention whether or not the rear bogie may be steered.

Each bogie frame is elongated in a direction transverse respecting the vehicle. Each bogie frame is supported by a pair of sub-frames 25 oscillatable on transversely aligned bearings 26 supported from the bogie frame by any appropriate brackets such as that shown at 27 in FIG. 9. A fluid operated ram 24 extends obliquely upwardly from each end of each sub-frame to the respective bogie frame whereby the operator is able at any time to tilt the sub-frame respecting the bogie frame by admitting fluid to the ram connected with one end of the sub-frame and exhausting fluid from the ram connected to the other end of the sub-frame. In fact, each ram is desirably double-acting as shown in the diagrammatic view FIG. 11. Air under pressure from line 28 is admitted by valve 29 or valve 30 to the appropriate end of ram cylinder 31. The control lever 32 operates the valves oppositely so that the opening of one valve to admit pressure to one end of cylinder 31 exhausts pressure from the other end of cylinder 31 through one of the vent ports 33, thereby causing piston 35 to move in the cylinder. The ram cylinder 31 is connected by clevis 36 with the appropriate bogie frame while the piston 35 is connected by clevis 38 with the appropriate sub-frame. While only one ram is illustrated in FIG. 11, it will be understood that all of the sub-frames are equipped with rams at each end (FIG. 2) and these can be controlled as desired.

The purpose of varying the angle of the sub-frame is to facilitate operation over soft terrain such as swampy territory or mud or snow. It is found that travel is greatly facilitated if the end of each sub-frame which is forward in the then-current direction of travel is elevated with respect to the end which is aft.

The high pressure source of air used to operate the rams 24 and other rams used in the vehicle is the tank 175 into which the air is pumped by an engine driven compressor 276 after passing through an air cleaner 177 and a dehydrating chamber 178 to remove all moisture which might cause difficulty in freezing.

Air is preferred as an operating fluid because there is no freezing problem and for the further important reason that the opposed sets of rams always contain air under pressure and function as air springs in addition to functioning as a means controlling the angles of the bogie sub-frame.

The gage 23 may be operated in any desired manner to indicate to the operator, at a glance, the position of the bogie sub-frames. In practice, each sub-frame is connected mechanically to a sensing device which, through electrical connections, operates the gage 23 on the dash. (FIG. 11.)

Each sub-frame 25 is provided at its ends with pairs of brackets 39 from which the thrust arms 40 project forwardly and rearwardly respectively as clearly appears in FIGS. 2 and 4. These arms are pivoted on bearing bosses 41 as best shown in FIG. 4. Each arm 40 has a detachable extension 42 connected with it by only a small number of bolts 43, the arrangement being adapted to facilitate speedy removal and replacement of individual supporting bags 45 whenever desired.

Each of the supporting bags 45 is a generally tubular flexible walled roll made of material appropriate for use in automobile tires, usually comprising natural or synthetic rubber reenforced with cord. No details are shown, since these materials are conventional.

At its end, each bag contracts to a bead 46 embraced between one flange 47 relatively fixed on disk 48 attached to a sleeve 49 which extends axially of the bag, and another flange 50 which is on the periphery of a disk 51 held detachably by bolt 52 to disk 48. Each sleeve 49 is fixed to a disk 48. Each disk 48 is attached by bolts or other suitable attaching means to a disk 51. Each disk 51 is attached to a shaft member 53 or 530 provided with antifriction bearings 54 for its rotation in one of the thrust arm extensions 42. These shaft elements 53 and 530 may be solid or tubular, the element 530 being illustrated as solid in FIG. 4 and the element 53 being illustrated as tubular for the purpose of placing the interior of the bag in communication with means for increasing or decreasing its inflation. For this purpose, the tubular shaft element 53 terminates within a pressure chamber 55 mounted externally on one of the thrust arm extensions 42 and having a fluid control pipe 56 in communication with it. A seal 57 at one side of the bearing and a seal 58 at the other precludes loss of air through the bearing. The tubular shaft element 53 communicates with the interior of sleeve 49 which has openings 59 opening into the tire bag 45, thus maintaining permanent and sealed communication between the fluid control duct 56 and the tire bag 45.

FIG. 11 includes a diagrammatic illustration of the means by which inflation control is effected. Pressure supply line 28 has a branch 60 leading to a pair of valves at 61 and 62 operated oppositely by a control lever 63. Depressing the righthand end of control lever 63 will admit fluid under pressure to line 56 and thence to the tire bag 45. Raising the righthand end of lever 63 will vent pressure from the bag through the duct port 64. It will be understood that each separate tire bag may have a similar control or a plurality of the bags, or all of them, can be operated through a single set of valves.

As above indicated, the sleeve 49 and the connected shaft element 53 and 530 turn in the bearings 54 of the thrust arm extension. In order to remove a bag 45, it is only necessary to unbolt the respective extensions 42 from the thrust arms 40 and disconnect the flexible air line 56. This permits the arm extensions to be withdrawn bodily with the shaft elements 53 and 530, completely exposing the bolts 52 which connect the shaft elements to the sleeve and also clamp the bead portions 46 of the bag. Replacement is equally simple.

The engine 70 and its mounting and cooling will hereinafter be referred to in more detail. For the present, it is desired only to describe the driving connections from the engine to the several tire bags 45. From the engine 70, drive shaft 72 leads to a transmission 73 from which power is transferred through transfer case 74 to a center differential 75. These parts are not shown in detail but may be in general accordance with the disclosure in Patent No. 2,267,562.

From the center differential 75, line shaft 76 leads rearwardly to rear differential 77 and line shaft 78 leads forwardly to the front differential 79. Thence flexibly jointed drive shafts 80 lead outwardly toward the ends of the respective bogie sub-frames 25. Within these sub-frames, substantially identical provision is made for driving forward and rearward pairs of tire bags. In each instance, the drive is to an arcuate series of spindles 85, which rest peripherally on the bag as best shown in FIG. 9. These spindles are journaled at their ends in the side members of the bogie sub-frame and desirably are each tapered toward their respective ends to concentrate their pressure engagement with the tire bags 45 on the portions of the bag intermediate the ends thereof.

The side members 88 of the respective bogie sub-frames are best shown in FIGS. 5, 6 and 7. Each comprises a closed gear casing 288 sealed at 89 to resist loss of lubricant through the bearing 90 with which the respective spindles 85 are supplied. Each spindle has a gear within the casing forming part of a train which will now be described.

The drive shaft 80 from the respective differential extends through a sealed bearing 92 into the casing 288 where it carries a driving gear 93 (FIG. 5). Through idlers 94 and 95 (FIG. 3), this driving gear operates the trains which actuate the spindles on the tire bags which are fore and aft of the driving gear 93.

Since the respective spindles 85 are in arcuate series, the respective spindle gears of each series 96, 97, 98, 99, 100 and 101 (FIG. 3) are likewise in arcuate series. An idler 102 meshing with idler 95 meshes with gears 96 and 97. Another idler 103 meshes with gears 97 and 98 to transmit motion to gear 98. Also meshing with idler 103 is idler 104 which drives idler 105 meshing with spindle gears 99 and 100. The idler 106 transmits motion from spindle gear 100 to spindle gear 101. The train is duplicated for each set of driving spindles whereby all of the spindles resting on a given tire bag are driven through such a train.

The engine 70, in the preferred embodiment shown, comprises two opposed banks of four cylinders each. Because of the particular service for which this specific vehicle is designed, these cylinders are aircooled. The details of cylinder construction are not important to the present disclosure but the cooling arrangement is. (FIG. 9.)

There is an air inlet at 110 at the rear of the cab. This communicates with an air mixing chamber 111 into which recirculating air is also admitted. Opening from the air mixing chamber 111 is cooling air passage 112 which is formed within a hood 113 which normally covers the engine and may be lifted to give access to the engine. In practice, the hood is hinged at 114 at its forward end and has a seal at 115 continuous from its rear end around its lower margin. The hood contains an opening at 116 directly over the engine and within this opening, enclosed by a shroud 117, is a horizontal cooling fan 123 operating on a vertical axis to direct the cooling air downwardly across the engine cylinders.

Below the cylinders there is a generally horizontal baffle at 118 in which there is an opening at 119 registering with a radiator 120 through which crankcase oil is circulated to be cooled by circulating air in warm weather and warmed in extremely cold weather. There is also an opening at 121 within which radiator 122 is disposed. The lubricating oil for the transmission 73 is circulated through the radiator 122 to be cooled in warm weather and kept warm in extremely cold weather.

Below and at the rear of the baffle 118 is an air collecting chamber at 124 between the sides of the frame. Air passing around the cylinders and through the radiators 120 and 122 reaches this chamber and normally escapes rearwardly through the outlet 125.

However, at the top of the chamber, and opening into the mixing chamber 111, there is a port at 126 controlled by thermostatically actuated shutters 127 which remain open until the engine warms up and during extremely cold weather, so that, whenever the air circulating over the engine and through the radiator is unduly cold, portions of the air which has passed over the engine, and has become somewhat heated thereby, are recirculated, thus keeping the engine at satisfactory and relatively uniform operating temperature. Despite the fact that the inlet passage 110 and the outlet passage at 125 remain open at all times, these passages are sufficiently restricted to assure the recirculation of a substantial volume of air whenever the thermostatically controlled shutter valve 127 is open.

Opening from the air mixing chamber 111 is a pipe 130 which leads to an air cleaner 131 having a pipe 132 and branch pipes 133 and 134 leading to the respective throttle bodies 135 and 135a. From throttle body 135, ducts 137, 138, 139 and 140 carry the gases to the respective cylinders at the forward end of the engine. From throttle body 135a, ducts 142, 143, 144 and 145 carry gases to the cylinders at the rear of the engine. The engine is supplied with fuel through fuel pipes (not shown) from fuel tank 146.

From the same tank, a fuel line 149 leads to an internal combustion type heater 150 having a hot air outlet at 151 convenient to the seat 136 and another outlet at 153 which serves a windshield defroster 154. It also serves the engine oil pan 277 and the battery compartment 147 through connections not shown. It also supplies hot air to a valved flexible pipe 148 which is used by the occupant of seat 136 to direct the hot air wherever needed.

The heater also supplies hot air to that compartment of the cab 155 in which the driver's seat 136 is located. To this end, the hollow hood 113 is provided with a transverse pipe 156 as shown in FIGS. 9 and 10. An apertured wall 157 at the end of this pipe registers with the apertured wall 158 of the heater when the hood is closed, as best shown in FIG. 10. This arrangement has a counterpart in the driver's compartment, wherein a flexible conduit 159 leads to the windshield defroster 160 and a valve (not shown) like that at 151 provides controlled warmth for the driver.

The driver has a steering control which, in the preferred embodiment of the invention, takes the form of a tiller 170 for admitting and exhausting hydraulic pressure to and from the steering cylinders 171 and 172 which, as best shown in FIG. 2, have their pistons connected with gears 173 on the bogie frame 21, whereby the frame may be oscillated on the axis of the fifth wheel 22 in either direction from the full line position shown in FIG. 2. One steering position is illustrated in dotted lines. Obviously, any steering movement of the bogie frame carries with it the two sub-frames and the inflated bags and propelling rollers.

The driver has before him a bank of pressure gages 176 (FIG. 10) individually connected to the respective inflated bags to indicate the precise inflation of each. The four levers 63 beside the operator admit or remove air to or from the four bags at the rear of the vehicle. The corresponding levers 63' beneath the gages 176 control the air pressure in the bags at the forward end of the vehicle.

The gage dials 23 immediately in front of the operator indicate the tilt of the respective bogie sub-frames while the levers 32 at the right of these dials control valves 29 and 30 as diagrammatically shown in FIG. 11 to admit or withdraw fluid pressure to or from the cylinders of rams 24 to control subframe tilt.

We claim:

1. In a vehicle of the character described, the combination with a vehicle frame, of supporting bogie frames beneath the vehicle frame, bogie sub-frames pivoted to respective bogie frames on transverse axes, at least one inflated roller mounted on each said bogie sub-frame for free rotation therebeneath, and at least one set of driving and supporting rolls journaled in each said bogie sub-frame in arcuate series, each said set of driving and supporting rolls resting on a corresponding inflated roller and being provided with driving connections, each said bogie frame being elongated transversely of the vehicle and having at least two said bogie sub-frames pivotally connected with it.

2. In a vehicle of the character described, the combination with a vehicle frame, of supporting bogie frames beneath the vehicle frame, bogie sub-frames pivoted to respective bogie frames on transverse axes, at least one inflated roller mounted on each said bogie sub-frame for free rotation therebeneath, and at least one set of driving and supporting rolls journaled in each said bogie sub-frame in arcuate series, each said set of driving and supporting rolls resting on a corresponding inflated roller and being provided with driving connections, each said bogie sub-frame being elongated longitudinally of the vehicle and having a plurality of said inflated rollers and a corresponding number of sets of said supporting and driving rolls mounted therein.

3. In a vehicle of the character described, the combination with a vehicle frame, of supporting bogie frames beneath the vehicle frame, bogie sub-frames pivoted to respective bogie frames on transverse axes, at least one inflated roller mounted on each said bogie sub-frame for free rotation therebeneath, and at least one set of driving and supporting rolls journaled in each said bogie sub-frame in arcuate series, each said set of driving and supporting rolls resting on a corresponding inflated roller and being provided with driving connections, a fifth wheel arrangement dirigibly connecting one said bogie frame with the vehicle, each said bogie frame being elongated transversely of the vehicle and having said pivotal connection with a plurality of said bogie sub-frames, each such sub-frame being longitudinally elongated and mounting a plurality of said inflated rollers and being provided with a corresponding number of sets of said driving and supporting rolls resting on said inflated rollers.

4. In a vehicle of the character described, the combination with a vehicle frame, of supporting bogie frames beneath the vehicle frame, bogie sub-frames pivoted to respective bogie frames on transverse axes, at least one inflated roller mounted on each said bogie sub-frame for free rotation therebeneath, at least one set of driving and supporting rolls journaled in each said bogie sub-frame in arcuate series, each said set of driving and supporting rolls resting on a corresponding inflated roller and being provided with driving connections, each said inflated roller being provided with a mounting shaft, flange means on said mounting shaft, annular tire beads at each end of each said inflated roller, said flange means being clampingly engaged with said beads, and thrust arms connected with the ends of the mounting shaft and extending generally horizontally to said bogie sub-frame, said thrust arms being pivotally connected to said bogie sub-frame at a point spaced from the pivotal connection between said sub-frame and said bogie frame, the said arms and shaft constituting means for mounting the respective inflated rollers on the bogie sub-frame.

5. In a vehicle of the character described, the combination with a vehicle frame, of supporting bogie frames beneath the vehicle frame, bogie sub-frames pivoted to respective bogie frames on transverse axes, at least one inflated roller mounted on each said bogie sub-frame for free rotation therebeneath, at least one set of driving and supporting rolls journaled in each said bogie sub-frame in arcuate series, each said set of driving and supporting rolls resting on a corresponding inflated roller and being provided with driving connections, a source of air under pressure, and non-rotatable conduit means from said source to said inflated rollers, each said inflated roller being continuously connected with said conduit means during vehicle operation for controlling inflation.

6. A vehicle of the character described comprising the combination with a vehicle frame, of a plurality of transversely elongated bogie frames connected therebeneath, at least one of which has a fifth wheel connection upon which it is movable for steering, longitudinally elongated bogie sub-frames mounted beneath each end of each said bogie frame, pairs of thrust arms pivotally connected with said bogie sub-frames adjacent their respective ends and having free end portions projecting in opposite directions from their respective pivotal connections, roller mounting shafts carried by corresponding free end portions of said respective thrust arms to extend transversely beneath said bogie sub-frames, clamping flanges carried by said shafts at points axially spaced thereon, roller tires of generally tubular form having constricted end portions provided with beads clamped between the flanges, and driving and supporting rolls mounted in arcuate series above each such tire in the respective bogie sub-frames and resting upon the tire for the support of the subframe therefrom, at least some of said rolls having driving connections for the rotation of the tires engaged thereby.

7. The device of claim 6 in further combination with means permanently connected to each such tire through its said shaft for controlling individually the inflation of said tire, the said means comprising valves having pressure and relief ports whereby inflation can be increased and decreased at the option of the operator of said valve.

8. In a vehicle of the character described, the combination of a vehicle frame, of a sub-frame beneath the vehicle frame in supporting relation thereto and having a pivotal connection upon which the sub-frame is tiltable on a transverse axis, tire means of substantial area rotatably connected with said sub-frame forwardly and rearwardly of said axis, and means for oscillating said sub-frame upon said axis to change the elevation of one end thereof with respect to the other end thereof, said tire means comprising inflated rollers elongated parallel to said axis and having mounting shafts and thrust arms connected with the shafts and pivotally connected with the tiltable sub-frame.

9. The device of claim 8 in which said means for tilting the sub-frame comprises opposed fluid-operated ram means for selectively depressing either end of the sub-frame below a position in which said sub-frame is horizontal.

10. A vehicle of the character described comprising the combination with a frame having a cab in its forward end, of bogies frames beneath the forward and rearward end of the vehicle frame, at least one of said bogie frames having a pivotal connection with said vehicle frame for steering, bogie sub-frames disposed in pairs beneath the respective bogie frames and individually provided with pivotal connections with the respective ends of said bogie frames for oscillation on an axis transverse with respect to said vehicle frame, means for tilting the said sub-frames upon their respective pivotal connections with said bogie frames, sets of driving and supporting spindle rolls mounted in arcuate series in each said bogie sub-frame, the respective sub-frames comprising housing means enclosing corresponding ends of said spindle rolls, means providing driving connections to said spindle roll ends thus enclosed, thrust arms connected with opposite ends of respective bogie sub-frames and having free end portions extending toward each other beneath said respective sub-frames, mounting shafts mounted in the free end portions of said arms, inflated rollers on the mounting shafts and engaged with respective sets of spindle rolls in supporting and driven relation thereto, an engine mounted on said vehicle frame and a drive from said engine to said driving connections and including a transmission, a center differential intermediate said bogie frames, forward and rearward differentials individual to said bogie frames, shafts leading from said center differential to said forward and rearward differentials, and shafts leading laterally from said forward and rearward differentials to said driving connections to said sets of spindle rolls.

11. The device of claim 10 in further combination with means in continuous connection with said inflated rollers for controlling the inflation thereof.

12. The device of claim 11 in which said means includes a source of gas under pressure and a valve having a vent port and a port connected with said source and a port connected with a said inflated roller, said mounting shaft of said roller being tubular and being provided with a port opening interiorly into said roller, said mounting shaft having a flexible hose connection with said valve.

13. A vehicle of the character described comprising the combination with a vehicle frame provided with a cab having an operator's station, of forward and rearward bogies mounted on the frame, said forward bogie being pivoted to said frame for steering movement, bogie sub-frames individually pivoted side by side to respective bogie frames, thrust arms connected in pairs to opposite sides of the respective bogie sub-frames, slightly inflated rollers mounted between the arms of the respective pairs to lie beneath respective sub-frames, supporting and driving spindle rolls mounted in sets in respective sub-frames and resting on said slightly inflated rollers, an engine on said vehicle frame having operative driving connections to spindle rolls of said respective sets for driving said respective slightly inflated rollers, means in continuous connection with said respective slightly inflated rollers for varying the inflation thereof, pressure gages conveniently accessible to the operator's station in said cab and individually connected with said respective slightly inflated rollers for showing the inflation thereof, the said means including valves conveniently accessible to an operator at said station for varying the inflation.

14. The device of claim 13 in further combination with means for tilting a said bogie sub-frame, means in said cab conveniently accessible to an operator at said station for effecting tilting sub-frame movement.

15. The device of claim 14 in further combination with means conveniently accessible to said operator for indicating the tilted position of said sub-frame.

16. In a vehicle of the character described, the sub-combination which comprises a generally tubular inflated roller, a vehicle frame member which receives support from said roller, and a pair of laterally spaced members having generally fore and aft extent, having detachable free end portions upon which said roller is mounted, the said roller being provided with a shaft having bearings in said free end portions and provided with a bore opening into said roller, one of said free end portions being provided with an air box enclosing the end of said roller and into which said bore opens, the said last mentioned free end portion being provided with means providing a seal about its said shaft bearing, whereby the air box is in sealed communication with the interior of said inflated roller, and a flexible air hose opening to and from said box.

17. The device of claim 16 further comprising a pressure gage with which said air hose communicates, whereby said pressure gage indicates roller inflation.

18. The device of claim 16 in which the vehicle is provided with roller inflating and deflating means with which the air hose communicates.

References Cited in the file of this patent
UNITED STATES PATENTS

| | | |
|---|---|---|
| Re. 24,272 | Albee | Feb. 12, 1957 |
| 878,156 | Pratt | Feb. 4, 1908 |
| 1,245,680 | Chase | Nov. 6, 1917 |
| 1,394,328 | Miller | Oct. 18, 1921 |
| 1,398,992 | Zimmerman | Dec. 6, 1921 |
| 1,628,813 | Stepp | May 17, 1927 |

(Other references on following page)

UNITED STATES PATENTS

| | | |
|---|---|---|
| 1,797,713 | Brogelli | Mar. 24, 1931 |
| 1,833,844 | Lusse | Nov. 24, 1931 |
| 1,846,784 | Borochoff | Feb. 23, 1932 |
| 1,926,273 | Fageol | Sept. 12, 1933 |
| 2,091,509 | Kramer | Aug. 31, 1937 |
| 2,151,229 | Piroumoff et al. | Mar. 21, 1939 |
| 2,175,529 | Kavik | Oct. 10, 1939 |
| 2,204,108 | Townsend | June 11, 1940 |
| 2,295,085 | Keehn | Sept. 8, 1942 |
| 2,334,037 | Ronk | Nov. 9, 1943 |
| 2,362,068 | Hollman et al. | Nov. 7, 1944 |
| 2,374,196 | Harbers | Apr. 24, 1945 |
| 2,380,181 | Krenzien | July 10, 1945 |
| 2,381,425 | Deal et al. | Aug. 7, 1945 |
| 2,490,485 | Spaeth | Dec. 6, 1949 |
| 2,558,417 | Brown | June 26, 1951 |
| 2,644,541 | Bachle | July 7, 1953 |
| 2,721,405 | Gardner | Oct. 25, 1955 |
| 2,736,004 | Greene | Feb. 21, 1956 |
| 2,798,568 | Zeller | July 9, 1957 |
| 2,802,541 | Albee | Aug. 13, 1957 |

OTHER REFERENCES

Publication, "Automotive Industries," June 15, 1955, vol. 112, No. 12, page 67.